US012679696B1

(12) United States Patent
Strother

(10) Patent No.: US 12,679,696 B1
(45) Date of Patent: Jul. 14, 2026

(54) SLACK CONDITION MONITORING SYSTEM FOR AN ELEVATOR SUSPENSION MEMBER

(71) Applicant: TK Elevator Corporation, Atlanta, GA (US)

(72) Inventor: Jordan Strother, Atlanta, GA (US)

(73) Assignee: TK Elevator Corporation, Atlanta, GA (US)

( * ) Notice: Subject to any disclaimer, the term of this patent is extended or adjusted under 35 U.S.C. 154(b) by 0 days.

(21) Appl. No.: 19/247,806

(22) Filed: Jun. 24, 2025

(51) Int. Cl.
*B66B 5/12* (2006.01)

(52) U.S. Cl.
CPC ...................................... *B66B 5/12* (2013.01)

(58) Field of Classification Search
CPC ................ B66B 5/12; B66B 7/10; B66B 7/08
See application file for complete search history.

(56) References Cited

U.S. PATENT DOCUMENTS

| | | | | |
|---|---|---|---|---|
| 4,548,297 A * | 10/1985 | Salmon | B66B 7/08 | 187/411 |
| 5,862,888 A * | 1/1999 | Iwakiri | B66B 7/08 | 187/292 |
| 6,123,176 A * | 9/2000 | O'Donnell | B66B 7/1215 | 187/393 |
| 6,315,084 B1 * | 11/2001 | Shon | B66B 7/08 | 187/346 |
| 8,047,335 B2 * | 11/2011 | Fargo | B66B 7/085 | 187/412 |
| 8,960,377 B2 * | 2/2015 | Zhang | B66B 7/048 | 187/412 |
| 9,038,782 B2 * | 5/2015 | Blanchard | B66B 7/08 | 187/412 |
| 9,650,227 B2 * | 5/2017 | Kalliomäki | B66B 5/125 | |
| 11,261,055 B2 * | 3/2022 | Blanchard | B66B 7/068 | |
| 2004/0149048 A1 * | 8/2004 | Attinger | B66B 5/12 | 73/862.393 |
| 2011/0297489 A1 * | 12/2011 | Blanchard | B66B 7/10 | 188/380 |

(Continued)

FOREIGN PATENT DOCUMENTS

| | | |
|---|---|---|
| CN | 201334290 Y | 10/2009 |
| CN | 201334291 Y | 10/2009 |

(Continued)

*Primary Examiner* — Michael A Riegelman
(74) *Attorney, Agent, or Firm* — Dinsmore & Shohl

(57) ABSTRACT

Embodiments of the present disclosure are directed to a slack monitoring system for an elevator system. The slack monitoring system includes at least one processor and a shackle assembly. The shackle assembly includes a first planar member, a second planar member, at least one biasing member, a first conductive member, and a second conductive member. An electric circuit is defined by the first conductive member, the second conductive member and the at least one processor such that when a current tension of the at least one suspension member of the plurality of suspension members is less than a predetermined tension threshold, the biasing member biases the first planar member or the second planar member to enlarge the gap thereby separating the first conductive member and the second conductive member to a distance that prohibits an electrical communication between the first conductive member and the second conductive member.

20 Claims, 10 Drawing Sheets

(56) References Cited

U.S. PATENT DOCUMENTS

| | | | | |
|---|---|---|---|---|
| 2012/0024637 | A1* | 2/2012 | Henneau | B66B 5/125 187/394 |
| 2019/0084801 | A1* | 3/2019 | Blanchard | B66B 1/3476 |

FOREIGN PATENT DOCUMENTS

| | | | | | |
|---|---|---|---|---|---|
| CN | 203237876 | U | | 10/2013 | |
| CN | 103588061 | A | * | 2/2014 | |
| CN | 103693523 | A | | 4/2014 | |
| CN | 204022178 | U | * | 12/2014 | |
| CN | 204038805 | U | * | 12/2014 | |
| CN | 204778131 | U | * | 11/2015 | |
| CN | 103588061 | B | | 3/2016 | |
| CN | 205802718 | U | | 12/2016 | |
| CN | 205873568 | U | * | 1/2017 | |
| CN | 107253648 | A | * | 10/2017 | B66B 7/08 |
| CN | 206580413 | U | * | 10/2017 | |
| CN | 207078850 | U | * | 3/2018 | |
| CN | 207877051 | U | * | 9/2018 | |
| CN | 209177779 | U | | 7/2019 | |
| CN | 110294383 | A | * | 10/2019 | B66B 5/02 |
| CN | 110872036 | A | | 3/2020 | |
| CN | 210366470 | U | | 4/2020 | |
| CN | 211594672 | U | * | 9/2020 | |
| CN | 212712267 | U | | 3/2021 | |
| CN | 113860118 | A | * | 12/2021 | B66B 7/10 |
| CN | 217627010 | U | * | 10/2022 | |
| CN | 113860118 | B | | 2/2023 | |
| CN | 219031412 | U | | 5/2023 | |
| CN | 220245171 | U | | 12/2023 | |
| CN | 117623053 | A | | 3/2024 | |
| DE | 102023133406 | A1 | * | 6/2025 | B66B 5/12 |
| ES | 2400826 | T3 | * | 4/2013 | B66B 5/0037 |
| FR | 3000480 | A1 | * | 7/2014 | B66B 7/10 |
| JP | 11171425 | A | | 6/1999 | |
| JP | 2008189462 | A | * | 8/2008 | |
| WO | 2007144456 | A1 | | 12/2007 | |
| WO | WO-2024023194 | A1 | * | 2/2024 | B66B 5/12 |

* cited by examiner

SLACK CONDITION MONITORING SYSTEM FOR AN ELEVATOR SUSPENSION MEMBER

TECHNICAL FIELD

The present disclosure generally relates to elevator suspension members and, more particularly, to systems for monitoring a slack condition within an elevator suspension member.

BACKGROUND

Elevator systems are required to monitor for a slack condition in elevator suspension members. A slack condition occurs when each of the elevator suspension members no longer have tension. Current elevator systems use a toggle switch with a rocker arm positioned against a plate member of a shackle assembly that is biased in a direction away from the rocker arm by the tension in all of the elevator suspension members coupled to that plate member. When all of the elevator suspension members fail, or are within the slack condition, biasing springs, which now have more tension against the plate member to push the plate in an upward direction, engage with the rocker arm and activate the toggle switch.

A need exists for a more reliable and efficient manner of monitoring and determining when the slack condition is present in any one elevator suspension member.

SUMMARY

In one embodiment, a slack monitoring system configured for detecting a slack condition in at least one suspension member of a plurality of suspension members of an elevator system is provided. The slack monitoring system includes at least one processor and a shackle assembly coupled to each of the plurality of suspension members. The shackle assembly includes a first planar member having a first surface and an opposite second surface, a second planar member having a third surface and an opposite fourth surface, the second planar member being spaced apart from the first planar member to define a gap, at least one biasing member positioned within the gap, a first conductive member extending from the second surface of the first planar member, and a second conductive member extending from the third surface of the second planar member. An electric circuit is defined by the first conductive member, the second conductive member and the at least one processor such that when a current tension of the at least one suspension member of the plurality of suspension members is less than a predetermined tension threshold, the biasing member biases the first planar member or the second planar member to enlarge the gap thereby separating the first conductive member and the second conductive member to a distance that prohibits an electrical communication between the first conductive member and the second conductive member.

In another embodiment, a slack monitoring system is configured for detecting a slack condition in at least one suspension member of a plurality of suspension members within an elevator system is provided. The elevator system has an elevator cab or a counterweight. The plurality of suspension members are coupled thereto within a hoistway. The plurality of suspension members move the elevator cab or the counterweight between a plurality of positions within the hoistway. The slack monitoring system includes at least one processor and a shackle assembly coupled to each of the plurality of suspension members. The shackle assembly includes a first planar member having a first surface and an opposite second surface, a second planar member having a third surface and an opposite fourth surface, the second planar member being spaced apart from the first planar member to define a gap, at least one biasing member positioned within the gap, an elongated member corresponding to a number of suspension members of the plurality of suspension members and positioned within the gap extending through the second planar member and the gap such that a distal end of the elongated member is positioned to extend beyond the fourth surface to a corresponding suspension member of the plurality of suspension members, a first conductive member extending from the second surface of the first planar member, and a second conductive member extending from the third surface of the second planar member. An electrical circuit is defined by the first conductive member, the second conductive member and the at least one processor such that when a current tension of the at least one suspension member of the plurality of suspension members is less than a predetermined tension threshold, the biasing member biases the first planar member or the second planar member to enlarge the gap thereby separating the first conductive member and the second conductive member to a distance that prohibits an electrical communication between the first conductive member and the second conductive member.

In yet another embodiment, a slack monitoring system configured for detecting a slack condition in at least one suspension member of a plurality of suspension members of an elevator system is provided. The elevator system has an elevator cab or a counterweight and a shackle assembly. The plurality of suspension members are coupled to the elevator cab or the counterweight and to the shackle assembly within a hoistway. The plurality of suspension members move the elevator cab or the counterweight between a plurality of positions within the hoistway. The shackle assembly has a first planar member having a first surface and an opposite second surface and a second planar member having a third surface and an opposite fourth surface. The second planar member is spaced apart from the first planar member to define a gap. An elongated member extends through the second planar member and the gap such that a distal end of the second planar member is positioned to extend beyond the fourth surface and is configured to couple to the at least one suspension member of the plurality of suspension members. At least one biasing member is positioned within the gap. The at least one biasing member is coaxially aligned with the elongated member such that the portions of the elongated member are axially received within the at least one biasing member to circumferentially surround the elongated member within the gap. The slack monitoring system includes at least one processor and an electrical circuit in electrical communication with the at least one processor. The electrical circuit is defined by the at least one processor, a first conductive member, a second conductive member, and at least two conductive flexible members that are electrically coupled to the at least one processor and one of the at least two conductive flexible members are electrically coupled to one of the first conductive member or the second conductive member and the other one of the at least two conductive flexible members is electrically coupled to the other one of the first conductive member or the second conductive member. In a first position, an electrical signal is configured to pass from the at least one processor and through the electrical circuit and in a second position, the electrical signal is prohibited from passing through the electrical circuit. When a predetermined tension is effected onto the shackle assembly caused by a tension of the at least one suspension member of the plurality of suspension members, the electrical circuit is in the first position, and in response to the slack condition when the tension exerted by the elevator suspension member is less than the predetermined tension, the biasing member biases the first planar member or the second planar member to enlarge the gap thereby separating the first conductive member and the second conductive member to a distance that causes the electrical circuit to be in the second position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
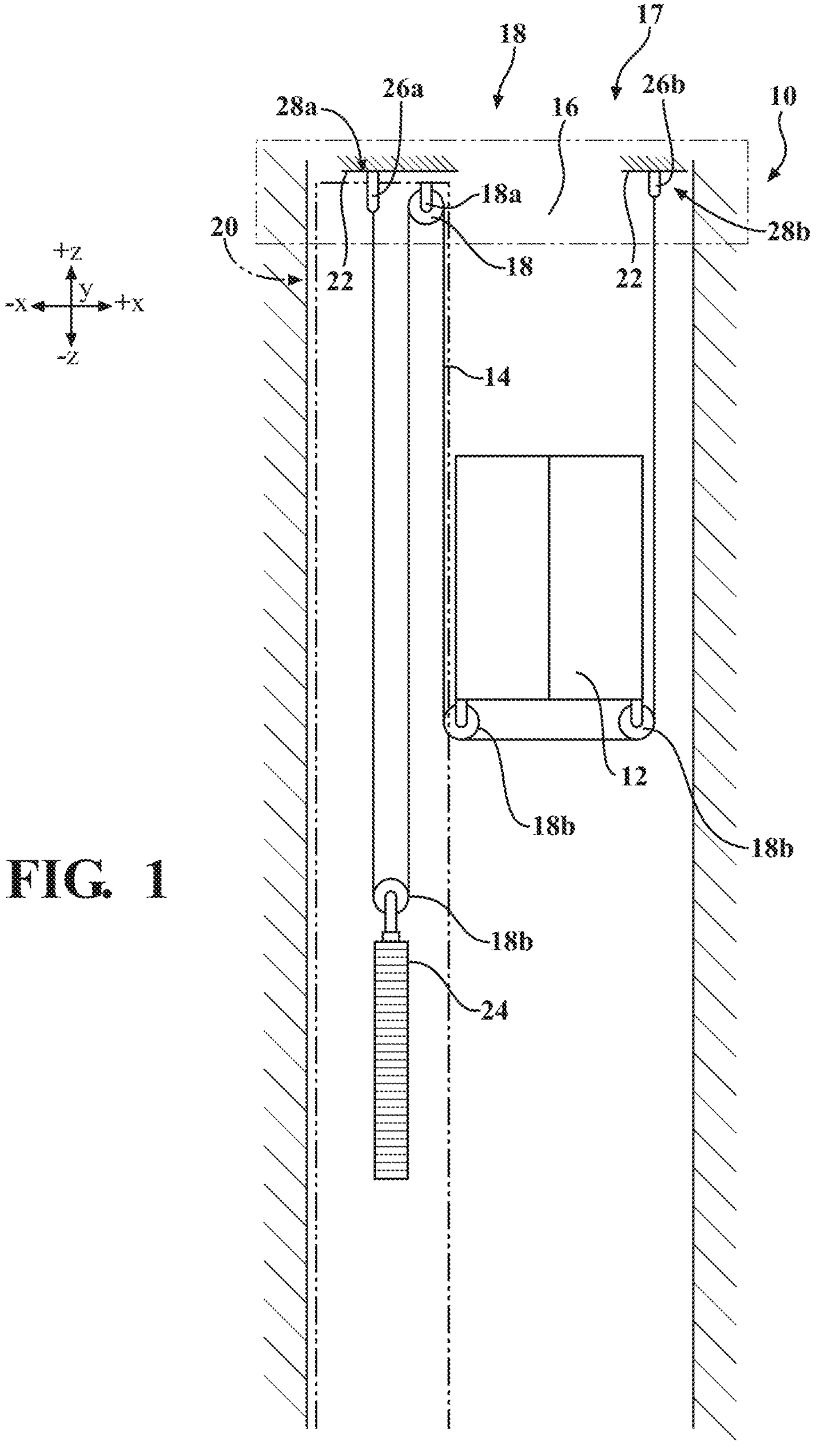
FIG. 1 schematically depicts an aspect of an example elevator assembly schematic, according to one or more embodiments shown and described herein.

Embodiments of the present disclosure are directed to improved systems and methods to monitor and identify a slack condition in at least one of a plurality of elevator suspension members. More specifically, the disclosed systems and methods provide an improvement to permit the monitoring of each suspension member individually, rather than requiring all suspension members to go slack at once as in the conventional systems. Further, the disclosed systems and methods provide for improved design modularity and scalability and a more reliability determination of the slack condition.

The disclosed systems include a monitoring assembly that is configured for detecting a slack condition in at least one of a plurality of suspension members of an elevator system. The elevator system includes suspension members that extend between and are coupled to an elevator cab within a hoistway and a shackle assembly and/or between a counterweight within the hoistway and a shackle assembly. The plurality of suspension members move the elevator cab and/or counterweight between a plurality of positions within the hoistway. The monitoring assembly includes at least one processor and the shackle assembly includes a first planar and a second planar member spaced apart by at least one biasing member to define a gap. The monitoring assembly further includes a first conductive member that extends from the first planar member into the gap and a second conductive member extending from the second planar member into the gap. The at least one processor is in electrical communication with the first conductive member and the second conductive member. The at least one processor is configured to supply an electrical signal to the first conductive member and/or the second conductive member and receive the electrical signal through the other one of the first conductive member and/or the second conductive member when the first conductive member and the second conductive member are within a predetermined distance from one another. The predetermined distance is maintained by a predetermined tension in each of the plurality of suspension members coupled to the shackle assembly. In response to a tension applied to the shackle assembly being less than the predetermined tension under a slack condition, the biasing member biases the first planar member or the second planar member to enlarge the gap thereby separating each of the first conductive member and the second conductive member of the shackle assembly to a distance that prohibits the electrical signal from returning to the at least one processor.

As such, the various components described herein may be used to carry out one or more processes to improve accuracy of determining a slack condition of each of the suspension members in an elevator system using electrical signals to passively improve the accuracy of slack condition monitoring as opposed to conventional mechanical monitoring. Further, various components described herein may be used to alert a technician or an elevator controller when slack conditions are detected to automatically and passively inhibit movement of the elevator suspension member.

Various systems for monitoring slack conditions in individual or all suspension members are described in detail herein.

As used herein, the term "longitudinal direction" refers to the forward-rearward direction of the assembly (i.e., in the +/−Y-direction depicted in FIG. 1). The term "lateral direction" refers to the cross-assembly direction (i.e., in the +/−X-direction depicted in FIG. 1), and is transverse to the longitudinal direction. The terms "vertical direction" or "below" or "above" or "upper" or "lower" refer to the upward-downward direction of the assembly (i.e., in the +/−Z-direction depicted in FIG. 1).

The phrase "electrical communication" or "electrically coupled" is used herein to describe the interconnectivity of various components of a slack monitoring system for a slack condition of suspension members within elevator assemblies and means that the components are connected either through wires, optical fibers, or wirelessly such that electrical, optical, data, electromagnetic signals, and/or the like may be exchanged between the components. It should be understood that other means of connecting the various components of the system not specifically described herein are included without departing from the scope of the present disclosure.

Figure 2:
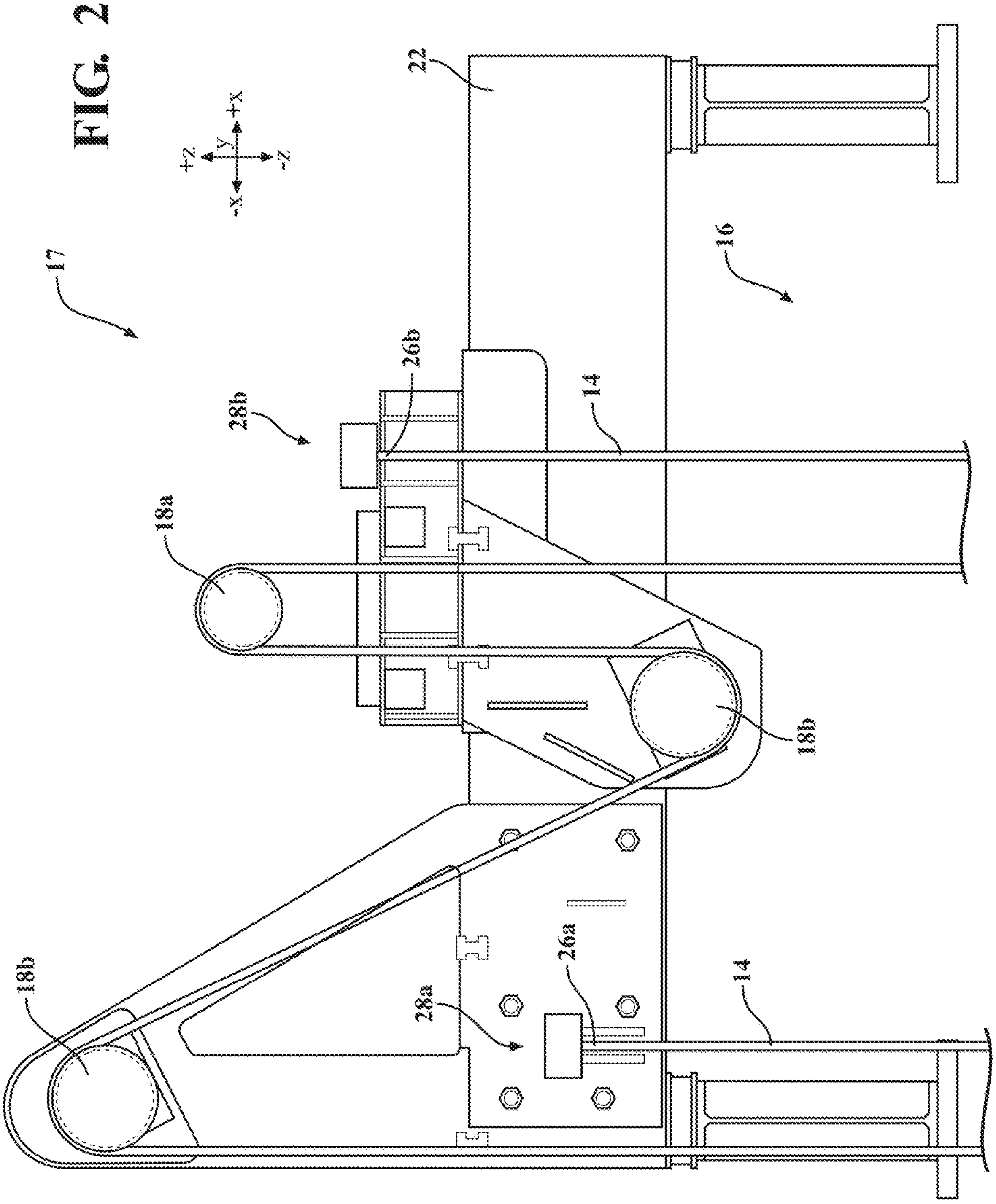
FIG. 2 schematically depicts a side view of an example sheave assembly of FIG. 1 according to one or more embodiments shown and described herein.

Referring now to the drawings, FIG. 1 depicts an elevator assembly schematic that illustrates various components for an example elevator assembly 10 and FIG. 2 schematically depicts an isolated view of a traction sheave assembly 17 of the example elevator assembly 10. The example elevator assembly 10 may include, without limitation, an elevator cab 12, a plurality of elevator suspension members 14 or hoisting members illustrated for schematic reasons as a single suspension member and herein referred to as suspension members, a hoistway 16 or elevator shaft, a plurality of sheaves 18, an example frame 20, and a plurality of weights 24 that act as a counterweight to the elevator cab 12. The plurality of weights 24 (e.g., counterweight) move within the example frame 20 in the system vertical direction (i.e., in the +/−Z direction). The example frame 20 may be an elevator frame, a counterweight elevator frame, and/or the like, as discussed in greater detail herein. The plurality of elevator suspension members 14 include a distal end **26*a* and a proximate end 26*b***.

Further, as illustrated and without limitation, the example elevator assembly 10 includes a number of sheaves 18 that are fixedly mounted to an upper portion of the example frame 20 to be positioned in an upper portion of the hoistway 16 above the elevator cab 12 in a vertical direction (i.e., in the +/−Z direction) and other sheaves configured to move with the weights 24 as the elevator cab 12 moves between various landings, as best depicted in FIG. 2. This is non-limiting, and any number of the plurality of sheaves 18 may be mounted anywhere within the hoistway 16 and there may be more than or less than the number of sheaves illustrated in the example elevator assembly 10.

At least one of the plurality of sheaves 18 within the hoistway 16 may include a motor such that the sheave is a traction sheave **18*a* capable of driving the plurality of elevator suspension members 14 through a plurality of lengths between the elevator cab 12 and the traction sheave 18*a*. Further, the plurality of sheaves 18 may further include a plurality of idler sheaves 18*b* that may also be mounted at various positions in the hoistway 16, and, in this aspect, are also coupled to the elevator cab 12. Idler sheaves 18*b* are passive (they do not drive the elevator suspension members 14, but rather guide or route the plurality of elevator suspension members 14) and form a contact point, or engagement point, with the elevator cab 12. The plurality of elevator suspension members 14 and the plurality of sheaves 18 move the elevator cab 12 between a plurality of positions within the hoistway 16 including to a plurality of landings. The plurality of sheaves 18 may include any combination of traction type sheaves 18*a* and idler type sheaves 18*b***.

As illustrated in FIG. 1, the elevator assembly 10 is an underslung system, with the idler sheaves **18*b* positioned on a bottom surface of the elevator cab 12. Each of the plurality of elevator suspension members 14 may be movably coupled to the traction sheave 18*a* and a portion of the plurality of elevator suspension members 14 may be coupled to the bottom surface of the elevator cab 12 to suspend the elevator cab 12 via the idler sheaves 18*b*. As such, the elevator suspension members 14 pass under the elevator cab 12 on a bottom of the elevator cab 12 via the idler sheaves 18*b*, and are coupled at the top of the hoistway 16 under tension to various structures, such as to the example frame 20, a corresponding one of a suspension bracket member 22, and/or the like, as illustrated in FIG. 2. For example, the proximate end 26*b* of the plurality of elevator suspension members 14 may be fixedly coupled to the suspension bracket member 22 at a shackle assembly 28*a* and the movably coupled portion of the plurality of elevator suspension members 14 are under tension to move the elevator cab 12 between various landings, as best illustrated in FIG. 2. Further, the traction sheave assembly 17 may include other structural components, such as an additional shackle assembly 28*b* that the distal end 26*a* of the elevator suspension members 14 terminate at the shackle assembly 28*b*, as best illustrated in FIG. 2**.

It should be appreciated that the illustrated schematics of FIGS. 1 and 2 are merely examples and that one skilled in the art appreciates that the routing of the plurality of elevator suspension members 14 may vary significantly or slightly from this illustration, for example based on a number of factors including the weight, the number of suspension members, the type of elevator system, the number of idler sheaves, and the like. For example, there may be several idler sheaves **18*b* positioned in the hoistway 16 between the traction sheave 18*a* and the contact point with the elevator cab 12. Other systems may include the plurality of elevator suspension members 14 extending a length between the weights 24 (e.g., counterweight) and the elevator cab 12. Further, the traction sheave 18*a* may be, for example, mounted to a lower surface of the hoistway 16. This is non-limiting, and the traction sheave 18*a* may be mounted anywhere within the hoistway 16 and there may be more than one traction sheave 18*a***.

Further, the position of the shackle assemblies **28*a*, 28*b* is illustrative and could be positioned on the elevator cab 12 side and/or the weights 24 (e.g., counterweight) side, in a machine room or on a top of the elevator cab 12 and/or mounted to the weights 24 (e.g., counterweight), belt shackles, rope shackles, and the like. Further, the depiction of the routing of the elevator suspension members 14 and the shackle assemblies 28*a*, 28*b* of FIG. 2 is for illustrative purposes only. It should be understood that the routing of the elevator suspension members 14, the positioning of the shackle assemblies 28*a*, 28*b*, the positioning if the idler sheaves 18*b*, the positioning of the traction sheave 18*a*** and the like, is not limiting and is being used for illustrative purposes only.

Figure 3:
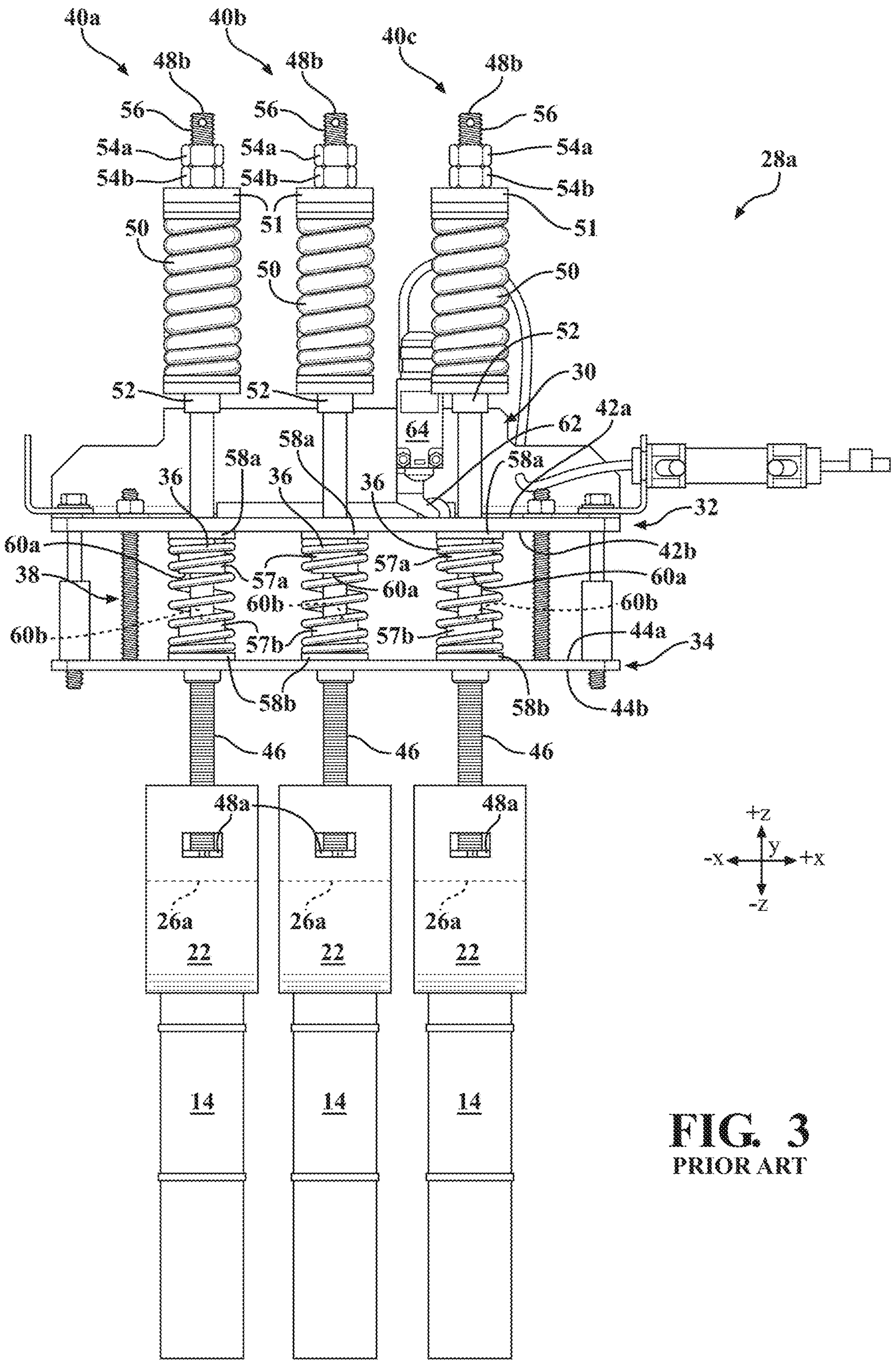
FIG. 3 PRIOR ART
FIG. 3 schematically depicts a plan front view in isolation of a conventional shackle assembly of FIG. 1 according to one or more embodiments shown and described herein.

Referring now to FIG. 3, the shackle assembly **28*a* is depicted in isolation with a conventional slack condition monitoring assembly 30. The shackle assembly 28*a* includes a first planar member 32 and a second planar member 34. The first planar member 32 includes a first surface 42*a* and a second surface 42*b* that is opposite of and spaced apart from the first surface 42*a* to define a thickness. The second planar member 34 includes a third surface 44*a* and a fourth surface 44***b* that is opposite of and spaced apart from the third surface 44*a* to define a thickness.

Figure 7:
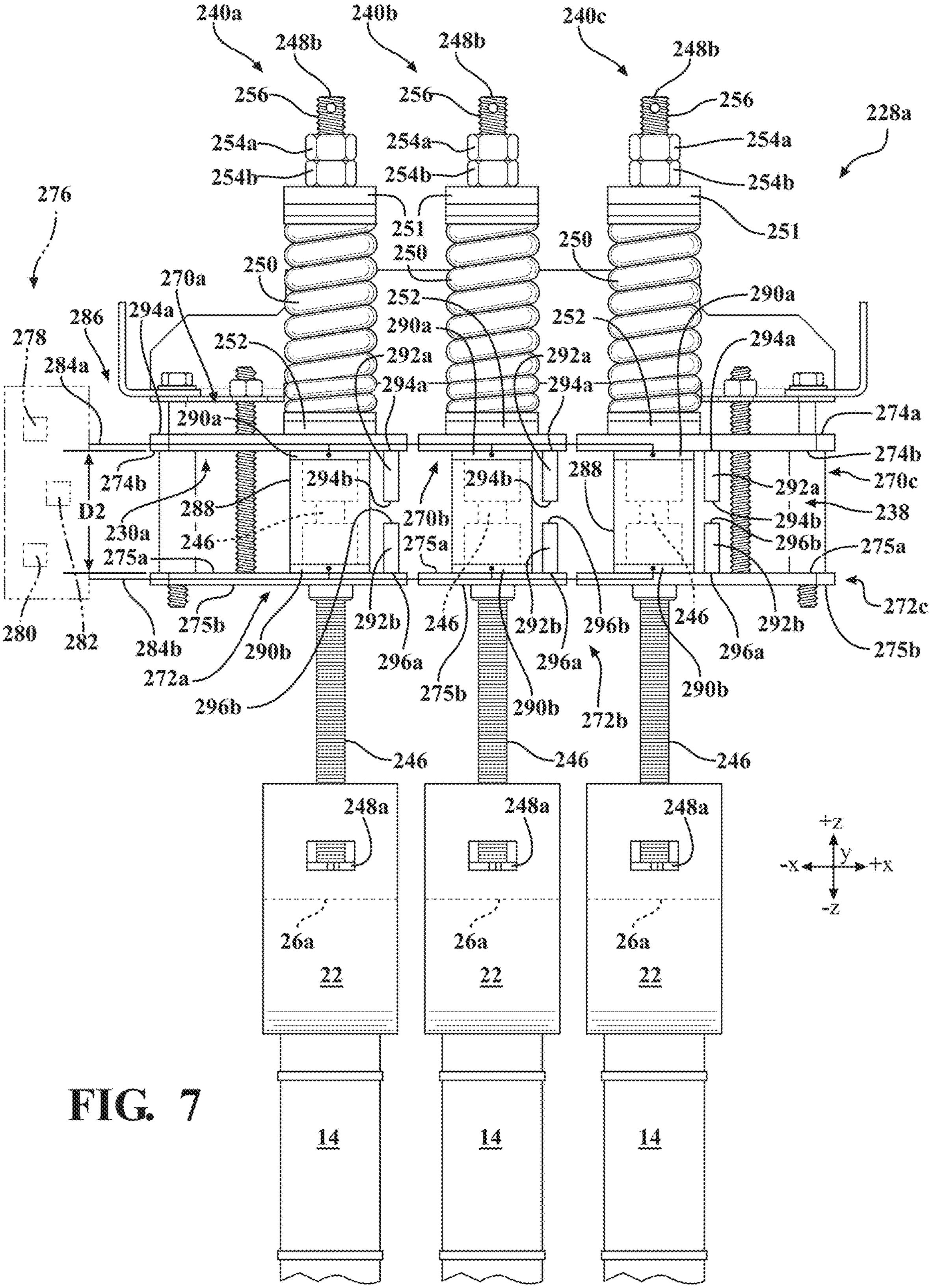
FIG. 7 schematically depicts a plan front view of a second example slack monitoring system having components for monitoring a slack condition of the elevator suspension members of FIG. 1 where each of the depicted elevator suspension members are in a normal condition according to one or more embodiments described and illustrated herein.

Each of the first planar member 32 and the second planar member 34 are separated or spaced apart by a biasing member 36 to define a gap 38 such that the second planar member 34 is positioned below the first planar member 32 in the vertical direction (i.e., in the +/−Z direction). The size of the first planar member 32 and the second planar member 34, the distance of the gap 38 therebetween, and the number of biasing members 36 may be based on a number of shackles present. For example, in the depicted embodiment, there are three elevator suspension members 14 which correspond to three sub-shackle assemblies 40*a*, 40*b*, 40*c*, each having a corresponding biasing member 36. In some embodiments, the biasing member 36 may be a coil spring, as depicted in FIG. 3. In other embodiments, the biasing member 36 may be any resilient material that is configured to be compressed and uncompressed, such as formed from an elastomer material, as depicted in FIG. 7. It should be appreciated that other materials may be utilized for the biasing member as understood by those having skill in the art.

Each of the three sub-shackle assemblies 40*a*, 40*b*, 40*c* further include an elongated member 46. The elongated member 46 extends through the first planar member 32 and the second planar member 34 including the gap 38 such that a distal end of the elongated member 46 is positioned to extend beyond the fourth surface 44*b* to couple to the corresponding one suspension bracket member 22 of the elevator suspension members 14. The elongated member 46 may be a threaded rod or have a threaded distal end 48*a* and proximate end 48*b*. As such, the elongated member 46 is generally rigid and formed from steel, iron, metal alloys, and/or other suitable materials.

Positioned above the first surface 42*a* of the first planar member 32 in the vertical direction (i.e., in the +/−Z direction) is a shackle biasing member 50 separated by a terminating nut member 51, 52 and a pair of threaded fasteners 54*a*, 54*b*, illustrated as a pair of hexagonal nuts that are independently operable onto a threaded portion 56 of the elongated member 46. It should be appreciated that the terminating nut member 51, 52 may be any kind of fastener that may or may not be threaded with the elongated member 46 such as, without limitation, a nut, weld, adhesive, epoxy, and the like. In other embodiments, the terminating nut member 51, 52 may be integrally formed with the elongated member 46 and thus may not be a fastener but a monolithic structure that forms a stop in the vertical direction (i.e., in the +/−Z direction) for the shackle biasing member 50. In other embodiments, the terminating nut member 51, 52 may be integrally formed with the shackle biasing member 50 and thus may not be a fastener, but a monolithic structure that forms a stop in the vertical direction (i.e., in the +/−Z direction) for the shackle biasing member 50 either as part of a coil of the shackle biasing member 50 or other portion of the shackle biasing member (e.g., a stopper portion, a base portion, and the like of the coil).

Further, the pair of threaded fasteners 54*a*, 54*b* are not limited to the pair of hexagonal nuts and may be any type of adjustable threaded fastener. An adjustment of each (at least the lower one) of the pair of threaded fasteners 54*a*, 54*b* changes a biasing force of the shackle biasing member 50 applied between the terminating nut member 51, 52 and at least the threaded fastener 54*a*.

Positioned in the gap 38 between the second surface 42*b* of the first planar member 32 and the third surface 44*a* of the second planar member 34 is a pair of bushing members 57*a*, 57*b*. The pair of bushing members 57*a*, 57*b* are configured to face one another such that a base 58*a* or flange of the bushing member 57*a* abuts or is positioned to be nearest to the second surface 42*b* of the first planar member 32 and such that a base 58*b* or flange of the bushing member 57*b* abuts or is positioned to be nearest to the third surface 44*a* of the second planar member 34. A face surface 60*a* of the bushing member 57*a* faces the third surface 44*a* of the second planar member 34 while a face surface 60*b* of the bushing member 57*b* faces the second surface 42*b* of the first planar member 32.

In some embodiments, each of the pair of bushing members 57*a*, 57*b* are fixedly coupled to the respective second surface 42*b* and the third surface 44*a*. In some embodiments, each of the pair of bushing members 57*a*, 57*b* are fixedly coupled via a fastener. Example fasteners include, without limitation, screw, nut and bolt, weld, epoxy, adhesive, rivets, hook and loop, snap fit, press fit, and/or the like.

Each of the bushing members 57*a*, 57*b* include a bore from the base 58*a*, 58*b* through the face surface 60*a*, 60*b*, respectively, to receive portions of the elongated member 46 in the vertical direction therethrough (i.e., in the +/−Z direction). Further, each of the bushing members 57*a*, 57*b* are coaxially aligned with the elongated member 46 and the biasing member 36 such that portions of the biasing member 36 circumferentially surround portions of the bushing members 57*a*, 57*b* and the portions of the elongated member 46 positioned within the bore of the bushing members 57*a*, 57*b*, respectively. Each suspension bracket member 22 receives either the proximate end 26*b* or the distal end 26*a* of the elevator suspension member 14. In the depicted example, the distal end 26*a* of the elevator suspension members 14 and the threaded distal end 48*a* of the elongated member 46 are received by the suspension bracket member 22 to releasably couple the corresponding elevator suspension member 14 to the corresponding sub-shackle assembly 40*a*, 40*b*, 40*c* through the coupling of the suspension bracket member 22 to the elongated member 46. This is non-limiting and the same could occur for the proximate end 26*b* of the elevator suspension members 14. That is, while not depicted, the proximate end 26*b* of the elevator suspension members 14 and the threaded distal end 48*a* of the elongated member 46 are each coupled to the suspension bracket member 22 to releasably couple the corresponding elevator suspension member 14 to the corresponding sub-shackle assembly 40*a*, 40*b*, 40*c* through the coupling of the suspension bracket member 22 to the elongated member 46.

As such, the tension from the corresponding elevator suspension member 14 onto the corresponding sub-shackle assembly 40*a*, 40*b*, 40*c* maintains the gap 38 at a predetermined distance between the first planar member 32 and the second planar member 34 in the vertical direction (i.e., in the +/−Z direction). In the event that all of the elevator suspension members 14 break or otherwise lose tension (e.g., become slack (herein "slack condition")), the lack of tension in all of the elevator suspension members 14 and a biasing force caused by each of the biasing members 36 in the corresponding sub-shackle assembly 40*a*, 40*b*, 40*c* moves or drives the first planar member 32 in the vertical direction (i.e., in the +/−Z direction). This movement causes the first surface 42*a* to engage with a rocker arm 62 movably connected to a switch 64 of the conventional slack condition monitoring assembly 30 such that the switch 64 is then toggled (e.g., changes states) illustrative of an activation of the slack condition.

Therefore, in the conventional shackle assembly 28*a* depicted in FIG. 3, the conventional slack condition monitoring assembly 30 is a mechanical device that includes a single switch 64 responsible for all of the sub-shackle assemblies 40*a*, 40*b*, 40*c* and requires that all of the corresponding elevator suspension members 14 to be broken (e.g., in the slack condition) to release enough of the tension from the shackle assembly 28*a* to cause the biasing members 36 to now have more force against the first planar member 32 to bias the first planar member 32 into the rocker arm 62 of the switch 64 in the vertical direction (i.e., in the +/−Z direction) to activate the switch 64.

Now referring to FIGS. 4A-4B and 5A-5B, the shackle assembly 128*a* of the present disclosure will be discussed in greater detail. It is understood that shackle assembly 128*a* is similar to the shackle assembly 28*a* and/or the shackle assembly 28*b* with the exceptions of the features described herein. As such, like features will use the same reference numerals with a prefix "1" for the reference numbers. As such, for brevity reasons, these features will not be described again.

Figure 4A:
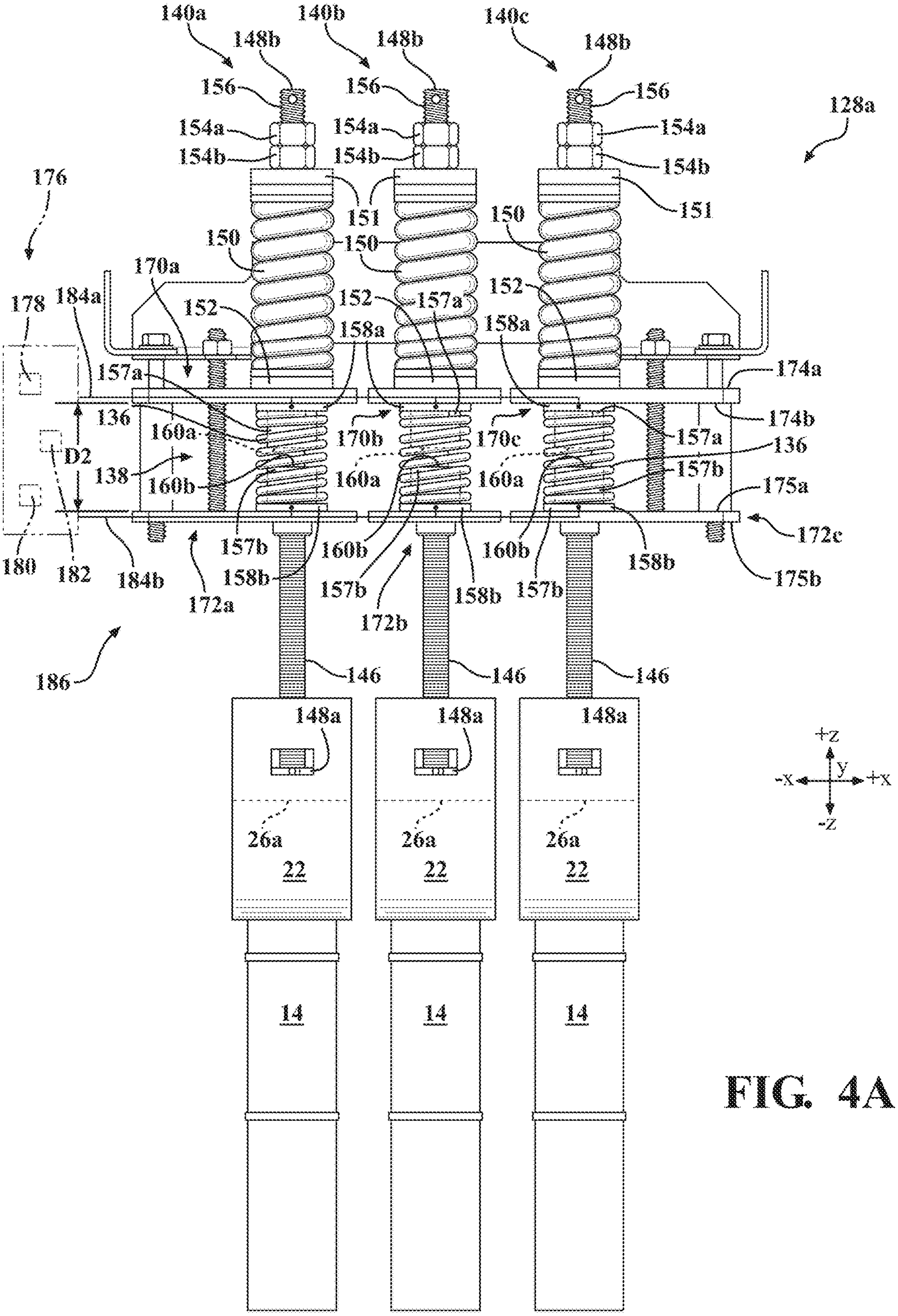
FIG. 4A schematically depicts a plan front view of an example slack monitoring system having components for monitoring a slack condition of elevator suspension members of FIG. 1 where each of the depicted elevator suspension members are in a normal condition according to one or more embodiments described and illustrated herein.
Figure 4B:
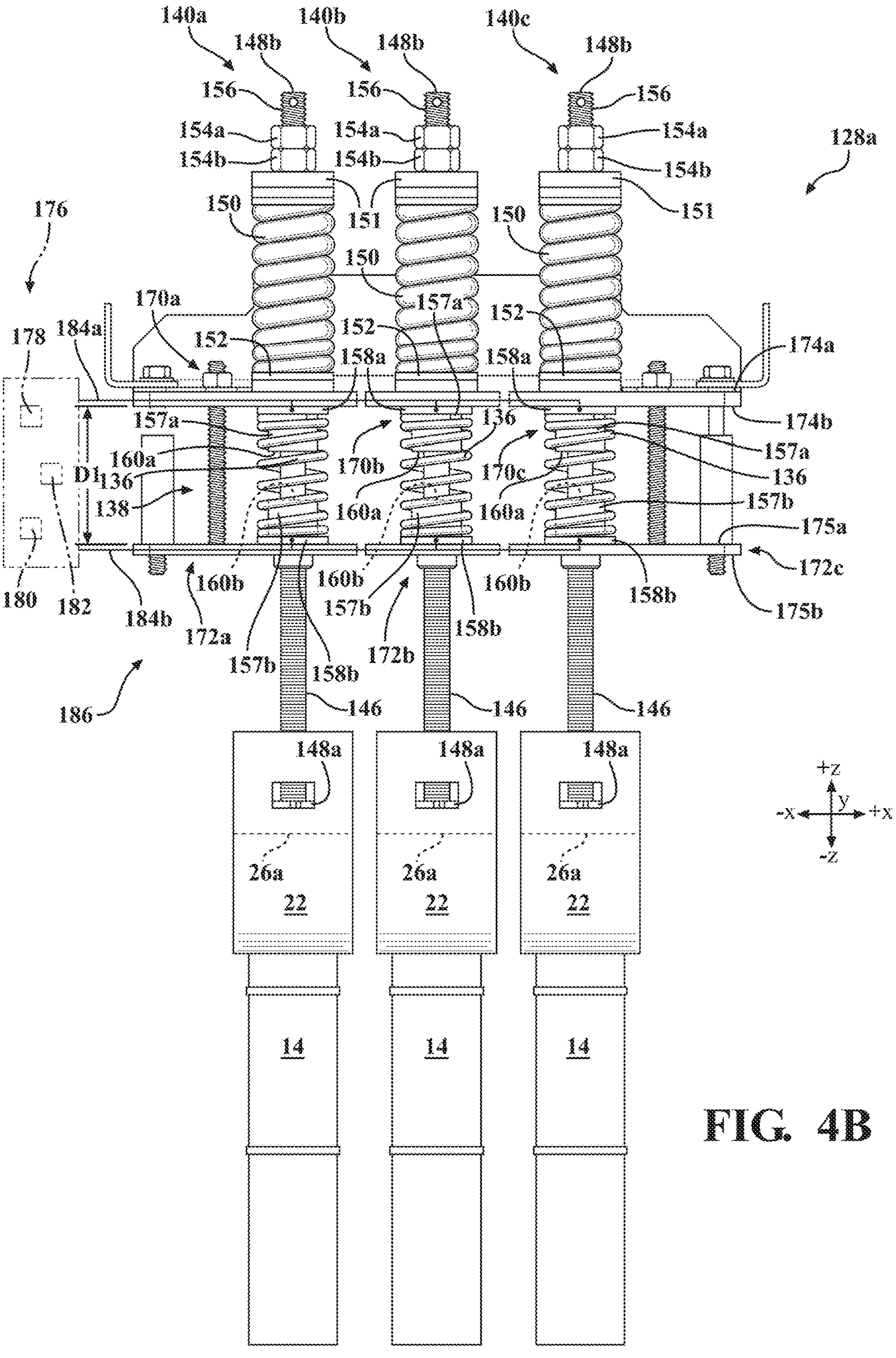
FIG. 4B schematically depicts a plan front view of the example slack monitoring system of FIG. 4A where each of the depicted elevator suspension members are in a slack condition according to one or more embodiments described and illustrated herein.

As best illustrated in FIGS. 4A-4B, in some embodiments, each of the three sub-shackle assemblies 140*a*, 140*b*, 140*c* have an independent first planar member 170*a*, 170*b*, 170*c* (upper planar member) and an independent second planar member 172*a*, 172*b*, 172*c* (lower planar member), that corresponds to each of the three sub-shackle assemblies 140*a*, 140*b*, 140*c*, respectively. Further, each of the independent first planar members 170*a*, 170*b*, 170*c* include an exterior surface 174*a* that is spaced apart from an interior surface 174*b* to define a thickness. Additionally, each of the independent second planar members 172*a*, 172*b*, 172*c* include an inner surface 175*a* that is spaced apart from an outer surface 175*b* to define a thickness.

In other embodiments, each of the three sub-shackle assemblies 140*a*, 140*b*, 140*c* utilize the first planar member 32 (FIG. 3) and/or the second planar member 34 (FIG. 3) as described above with respect to the three sub-shackle assemblies 40*a*, 40*b*, 40*c* (FIG. 3), respectively in place of, or rather than, the independent first planar members 170*a*, 170*b*, 170*c* and the independent second planar members 172*a*, 172*b*, 172*c*.

Still referring to FIGS. 4A-4B, the shackle assembly 128*a* and/or the elevator assembly 10 (FIG. 1) further includes a slack monitoring system 176 that includes at least one processor 178. The at least one processor 178 may be part of an electronic control unit, a central processing unit (CPU), and the like, for performing the functions as described herein. As such, the at least one processor 178 may be part of the slack monitoring system 176. Each of the at least one processor 178 may be a controller, an integrated circuit, a microchip, central processing unit or any other computing device. As such, each of the at least one processor 178 may be configured to receive, analyze and process electrical data and/or electrical signals derived from at least one of the pair of bushing members 157*a*, 157*b*, as discussed in greater detail herein. Further, the lack of the electrical data and/or electrical signals from at least one of the pair of bushing members 157*a*, 157*b* may also be analyzed and processed by the at least one processor 178, as discussed in greater detail herein. The at least one processor 178 may be further configured to perform calculations and mathematical functions, convert data, generate data, control elevator components (e.g., stop the elevator assembly 10 under a slack condition, provide instructions to other components of the elevator assembly 10 (e.g., a master controller)) and the like.

The slack monitoring system 176 may include other components, for example one or more memory modules 180 that stores logic that is executable by the at least one processor 178 and a database 182. The one or more memory modules 180 may be a non-transitory computer readable medium and may be configured a RAM, ROM, flash memories, hard drives, and/or any device capable of storing computer-executable instructions, such that the computer-executable instructions can be accessed by the one or more processors. The computer-executable instructions may include logic or algorithms, written in any programming language of any generation such as, for example, machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), and/or all their equivalents. Accordingly, the systems, methods, processes, and/or computer product programs described herein may be implemented in any conventional computer programming language, as preprogrammed hardware elements, or as a combination of hardware and software components.

Referring back to FIGS. 4A-4B and 5A-5B, an amount, or number, of each of the pair of bushing members 157*a*, 157*b* in the shackle assembly 128*a* corresponds to the number of sub-shackle assemblies (e.g., sub-shackle assemblies 140*a*, 140*b*, 140*c* depicted in the embodiment of FIGS. 4A-4B, which correspond to the number of elevator suspension members 14). Each of the pair of bushing members 157*a*, 157*b* in the shackle assembly 128*a* are in electrical communication with the slack monitoring system 176 and the at least one processor 178. In the depicted embodiment, each of the pair of bushing members 157*a*, 157*b* are in electrical communication with the slack monitoring system 176 and the at least one processor 178 thereof via conductive flexible members 184*a*, 184*b*, such as, without limitation, electrical wires. Such an arrangement is non-limiting and it should be appreciated that each of the pair of bushing members 157*a*, 157*b* are in electrical communication with the slack monitoring system 176 and the at least one processor 178 via any method as appreciated by those having skill in the art. For example, and without limitation, one of the conductive flexible members 184*a*, 184*b* may be electrically coupled to the at least one processor 178 and to a ground source such as the frame 20 (FIG. 1).

In the depicted embodiments, the conductive flexible members 184*a*, 184*b* terminate at a corresponding one of the pair of bushing members 157*a*, 157*b* and at the slack monitoring system 176 such that each of the pair of bushing members 157*a*, 157*b*, the conductive flexible members 184*a*, 184*b* and the slack monitoring system 176 form or define an electrical circuit 186. Therefore, it should be understood that each of the pair of bushing members 157*a*, 157*b* are formed with or include portions of an electrically conductive material that are electrically isolated from other components (e.g., the biasing member 136, the independent first planar member 170*a*, 170*b*, 170*c*, the independent second planar member 172*a*, 172*b*, 172*c*, and the like). The conductive flexible members 184*a*, 184*b* are in electrical communication with the corresponding one of the pair of bushing members 157*a*, 157*b* and with the slack monitoring system 176.

As such, electrical signals generated by the slack monitoring system 176 may travel through the electrical circuit 186 e.g., from the slack monitoring system 176, through one of the conductive flexible members 184a, 184b, through one of the pair of bushing members 157a, 157b, into and through the other one of the pair of bushing members 157a, 157b, through the other one of the conductive flexible members 184a, 184b and back to the slack monitoring system 176 to define the electrical circuit 186. The at least one processor 178 and/or other components of the slack monitoring system 176 may then determine whether the electrical signal(s) traveled through the electrical circuit 186 at a predetermined rate. That is, the electrical signal(s) may be generated and/or transmitted through the electrical circuit 186 at predetermined intervals, be a single discrete signal, or multiple signals, and/or at a continuous rate to detect the slack condition when any one of the electrical signal(s) do not return to the at least one processor 178 within a predetermined amount of time.

Figure 5A:
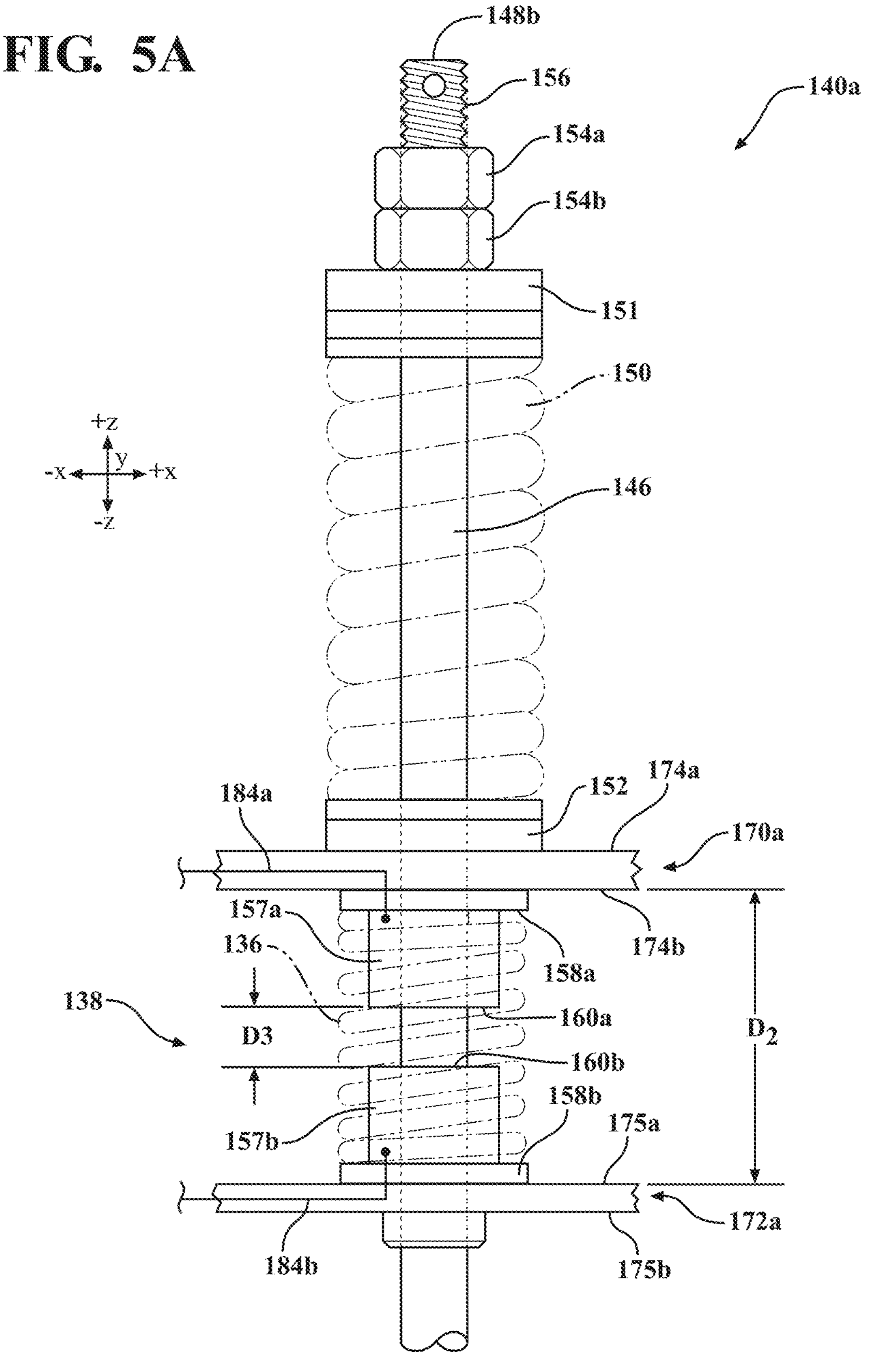
FIG. 5A schematically depicts a plan front view of an isolated shackle assembly of the example slack monitoring system of FIG. 4A where the depicted elevator suspension member is in the normal condition according to one or more embodiments described and illustrated herein.

In order for the electrical signal to make it back to the slack monitoring system 176 after the slack monitoring system 176 sends, generates and/or transmits the electrical signal, the electrical signal needs to pass through each one of the pair of bushing members 157a, 157b. For this to occur, the face surface 160a, 160b of each of the pair of bushing members 157a, 157b must be within a predetermined distance from one another, as best illustrated in FIGS. 4A and 5A. In a non-limiting example, the predetermined distance may be 5 millimeters. This is non-limiting, and the predetermined distance may be greater than or less than 5 millimeters. Therefore, the gap 138 is maintained at a predetermined distance D2 by the tension of the corresponding elevator suspension member 14, which is a tension that is greater than the tension caused by the biasing member 136 to hold or otherwise maintain the gap 138 at the distance D2. In other words, the tension of the corresponding elevator suspension member 14 for each of the three sub-shackle assemblies 140a, 140b, 140c maintains or holds the pair of bushing members 157a, 157b at a first position to permit the electrical signal to pass through each one of the pair of bushing members 157a, 157b.

Figure 5B:
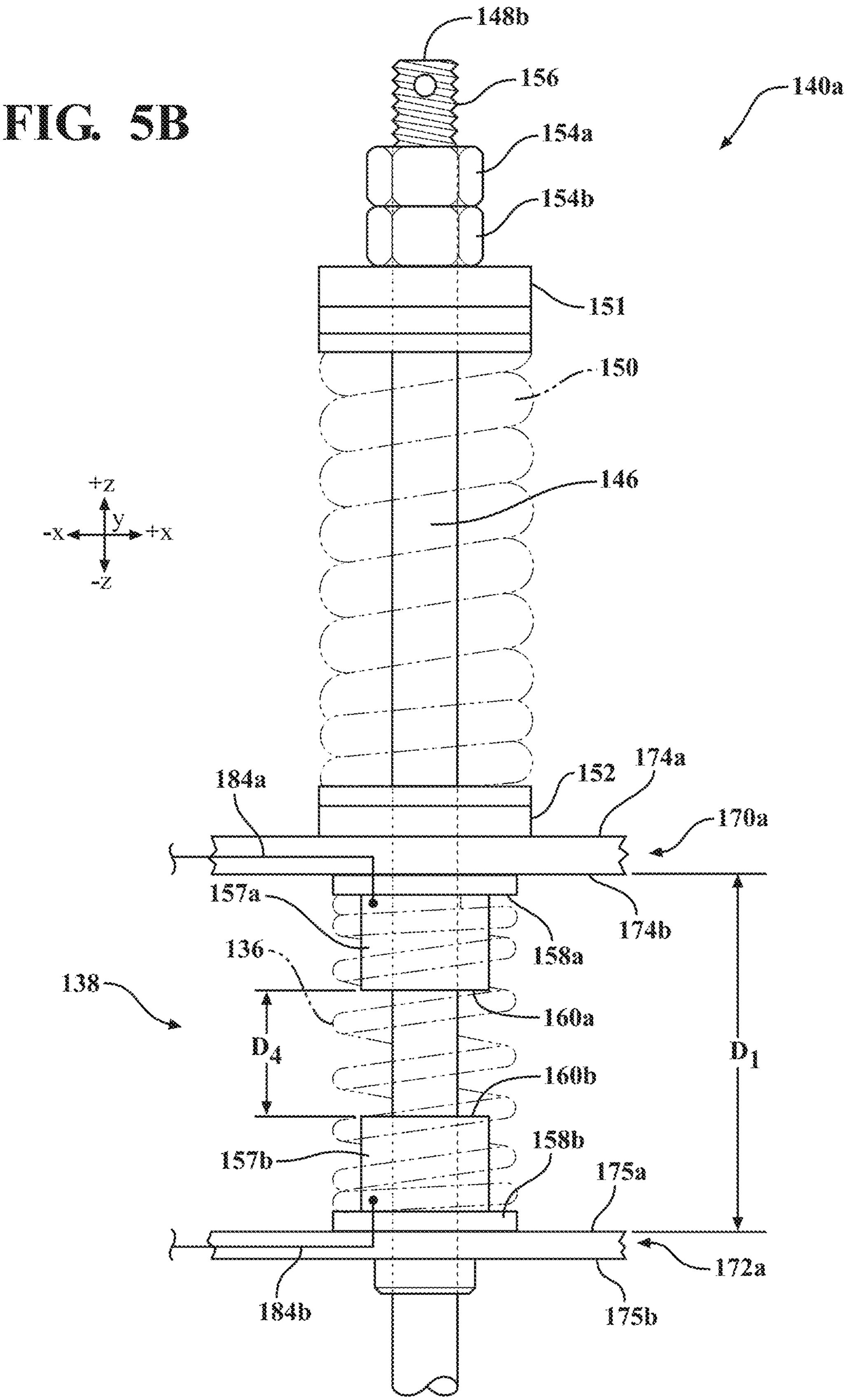
FIG. 5B schematically depicts a plan front view of an isolated shackle assembly of the example slack monitoring system of FIG. 4B where the depicted elevator suspension member is in the slack condition according to one or more embodiments described and illustrated herein.

As such, each of the pair of bushing members 157a, 157b are conductive members that are required to be held within the predetermined distance by the tension caused by the corresponding one of the elevator suspension members 14 to allow the electrical signal to pass through each of the pair of bushing members 157a, 157b, depicted as a distance with arrow D3 in FIG. 5A. When the predetermined distance is exceeded or otherwise not maintained, the electrical signal is prohibited from passing through each of the pair of bushing members 157a, 157b, depicted as a distance with arrow D4 in FIG. 5B. The distance D3 is smaller than the distance D4. That is, the gap between each of the pair of bushing members 157a, 157b depicted as the distance with arrow D4 in FIG. 5B, is too large to permit electrical signals to pass between the pair of bushing members 157a, 157b. This occurs when the corresponding one of the elevator suspension members 14 has failed, reducing the tension (e.g., causing the slack condition) on the sub-shackle assembly 140a, 140b, 140c, as best illustrated in FIGS. 4B and 5B. In other words, when there is not enough tension of the corresponding elevator suspension member 14 for at least one of the three sub-shackle assemblies 140a, 140b, 140c to maintain or hold the pair of bushing members 157a, 157b at the first position, the biasing member 136 moves or separates at least one of the pair of bushing members 157a, 157b to a second position to inhibit the electrical signal to pass through each one of the pair of bushing members 157a, 157b. The second position corresponds to the distance D4 or the distance D1 of the gap 138.

As such, when the tension of the biasing member 136 is greater than the tension applied by the corresponding elevator suspension member 14, the gap 138 is increased to a distance D1, which is greater than the distance D2. The biasing member 136 also moves either one or both of the pair of bushing members 157a, 157b and/or either one or both of the independent first planar member 170a, 170b, 170c and the independent second planar member 172a, 172b, 172c to increase the gap 138, which also increases the distance between the face surface 160a, 160b of each of the pair of bushing members 157a, 157b, respectively, to exceed the predetermined distance from one another.

In the depicted embodiment, this results in the slack monitoring system 176 not receiving the electrical signal back in a predetermined time. In response, the slack monitoring system 176 initiates an alert to stop the traction sheave 18a (FIG. 2) which in turn prohibits the elevator cab 12 and/or weights 24 from moving (FIG. 1). The alert may be a program command executed by the at least one processor 178 to stop the traction sheave 18a (FIG. 2) either directly to the traction sheave 18a and/or to an elevator controller (master controller for the elevator assembly 10 (FIG. 1)), which in turn stops any movement. In addition, or alternatively, the alert may be a command to a CPU or other electronic device to alert a user or technician to stop the elevator assembly 10 or to take some action to perform maintenance and/or the like.

As such, it should now be understood that the electrical circuit 186 is arranged such that each of the pair of bushing members 157a, 157b are now electrical contacts and are configured to make or define an electrical switch such that when the biasing member 136 is compressed enough by the tension generated in or by the elevator suspension member 14, the switch defined by the pair of bushing members 157a, 157b in the electrical circuit 186 is closed. Conversely, under the slack condition, when the tension generated by the elevator suspension member 14 is less than the predetermined tension amount, the biasing member 136 exerts a greater tension or force to move or drive one of the pair of bushing members 157a, 157b away from one another to create an open switch, thereby not permitting the electrical signal to return to the at least one processor 178 and/or other component of the slack monitoring system 176. It should be appreciated that this is non-limiting and the opposite switch configuration may be used. For example, and without limitation, under normal tension conditions for at least one or the plurality of elevator suspension members 14, the slack monitoring system 176 and the electrical circuit 186 may be configured such that there is an open switch, thereby not permitting the electrical signal to return to the slack monitoring system 176. Further, under the slack condition, for at least one or the plurality of elevator suspension members 14, the slack monitoring system 176 and the electrical circuit 186 may be configured such that there is a closed switch, thereby permitting the electrical signal to return to the slack monitoring system 176.

It should be appreciated that the use of the pair of bushing members 157a, 157b is non-limiting, and that other components may be used. For example, the distal end 148a of the elongated member 146 could be used in place of the pair of bushing members 157a, 157b such as, for example, in an only-shackle-spring arrangement. Further, in other embodiments, only a single bushing member may be used, or other conductive members may be used. Further, the size and shape of one or the pair of bushing members 157a, 157b is non-limiting.

Further, in some embodiments, each of the pair of bushing members 157*a*, 157*b* are fixedly coupled to the respective interior surface 174*b* and the inner surface 175*a*. In some embodiments, each of the pair of bushing members 157*a*, 157*b* are fixedly coupled via a fastener. Example fasteners include, without limitation, screw, nut and bolt, weld, epoxy, adhesive, rivets, hook and loop, snap fit, press fit, and/or the like.

Figure 6A:
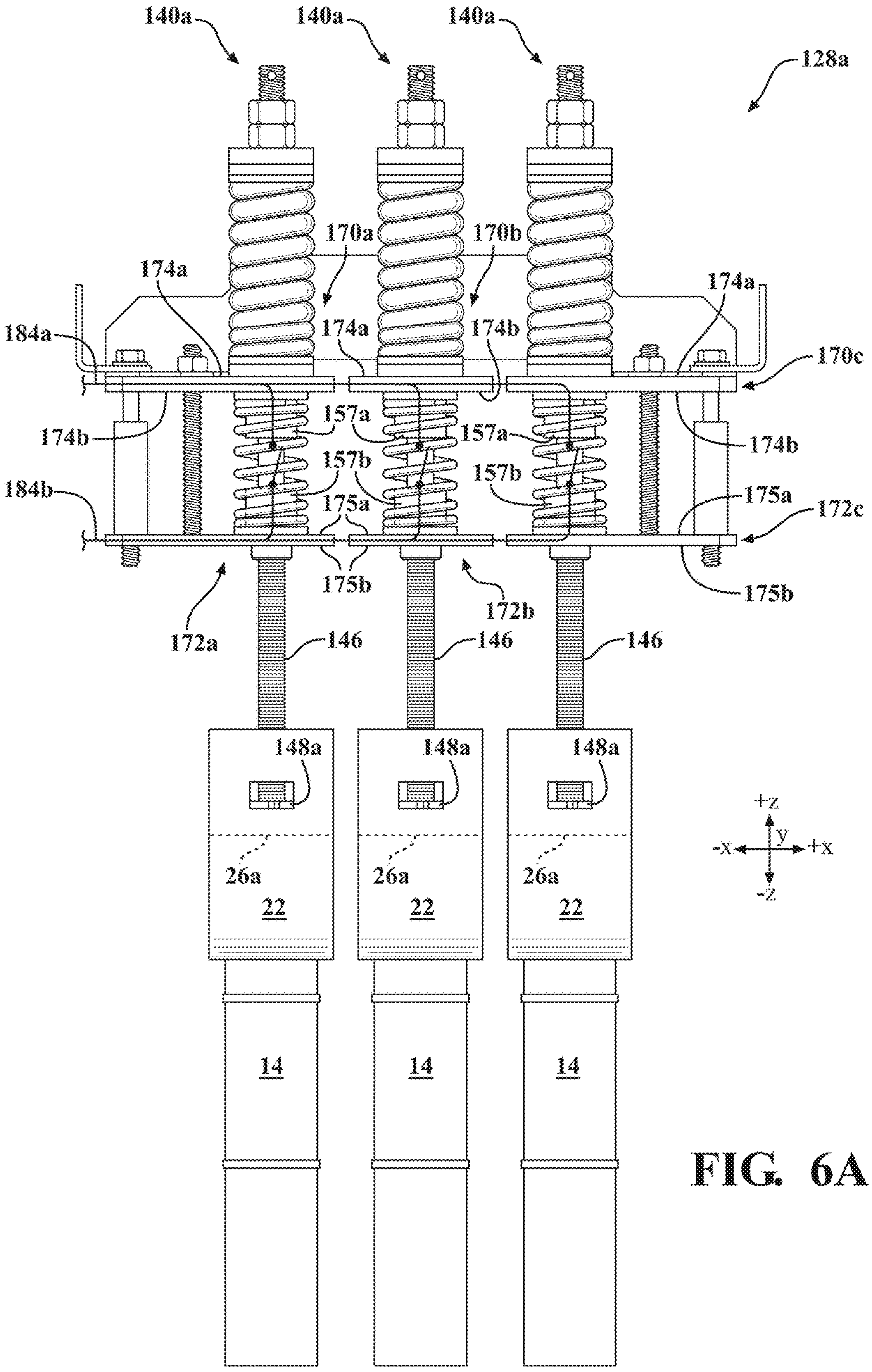
FIG. 6A schematically depicts a plan front view of the example slack monitoring system of FIG. 4B depicting an example parallel switch circuit arrangement of an electrical circuit of the example slack monitoring system according to one or more embodiments described and illustrated herein.

Now referring to FIG. 6A, in this depicted embodiment, the electrical circuit 186 may be arranged as three switches in a parallel circuit arrangement. That is, each of the pair of bushing members 157*a*, 157*b* that corresponded to each of the sub-shackle assemblies 140*a*, 140*b*, 140*c* define electrical switches, as described in greater detail herein, and are arranged to be in a parallel arrangement. As depicted, FIG. 6A is schematically depicted in the slack condition (e.g., the tension of the biasing member 136 is greater than the tension applied by the corresponding elevator suspension member 14 such that the gap 138 is increased to the distance D1 and either one or both of the pair of bushing members 157*a*, 157*b* exceed the predetermined distance from one another).

As such, each of the switches (e.g., the electrical contact between each of the pair of bushing members 157*a*, 157*b* that corresponded to each of the sub-shackle assemblies 140*a*, 140*b*, 140*c*) are depicted in an open configuration. That is, in this configuration, the electrical signal is not transferred or is prohibited from continuing through the electrical circuit 186 by not passing through one of the pair of bushing members 157*a*, 157*b* for at least one of the sub-shackle assemblies 140*a*, 140*b*, 140*c*. This arrangement advantageously may be used when it is desirable to have all of the sub-shackle assemblies 140*a*, 140*b*, 140*c* to be in the slack condition to generate the alert of the slack condition. As such, as illustrated, the parallel arrangement requires all of the sub-shackle assemblies 140*a*, 140*b*, 140*c* to be in the open switch configuration for the slack monitoring system 176 to generate the alert. The parallel arrangement of the electrical circuit 186 may be defined by the arrangement of the conductive flexible members 184*a*, 184*b* and the interaction with the respective pair of bushing members 157*a*, 157*b* and the slack monitoring system 176.

Figure 6B:
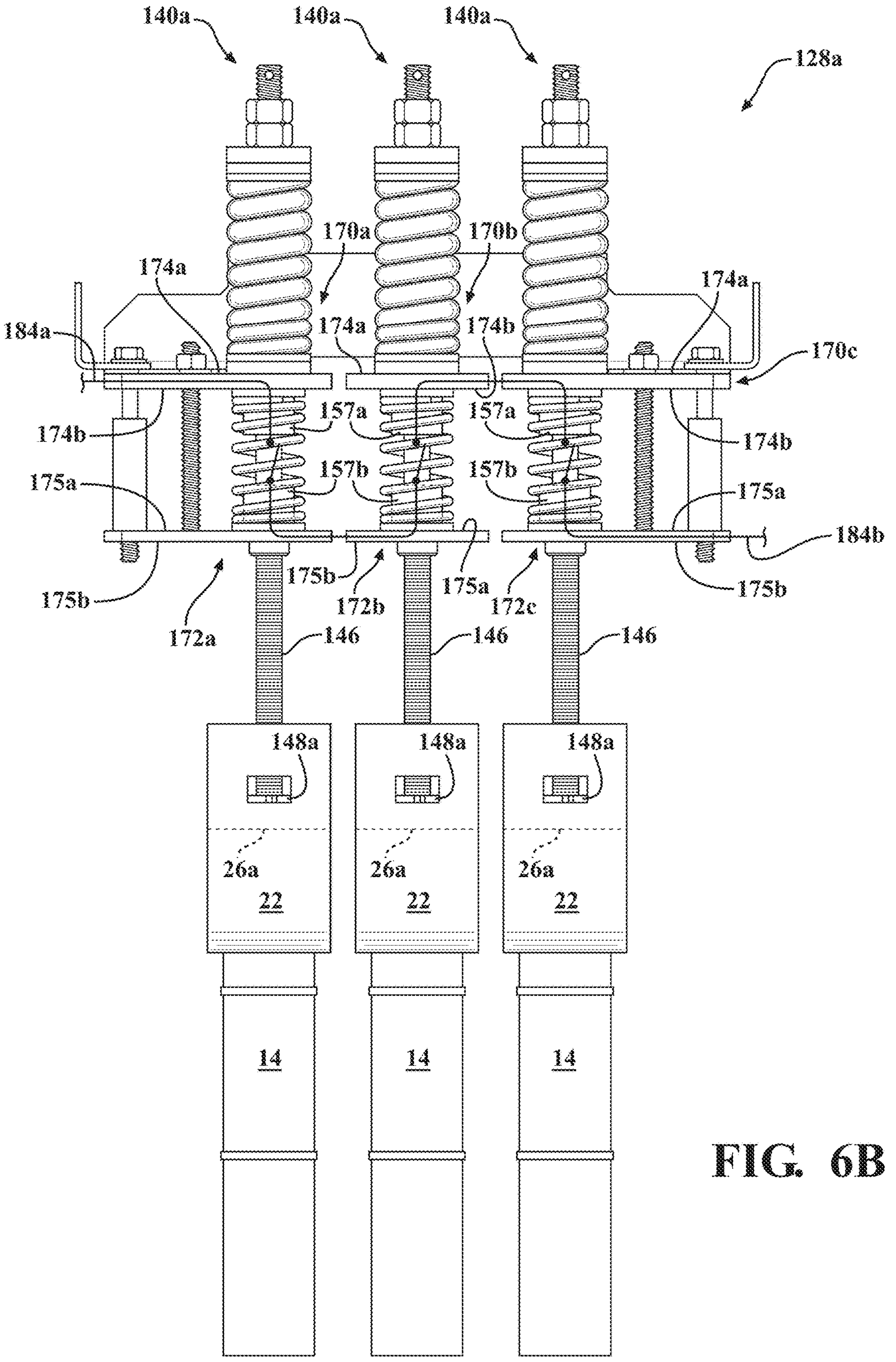
FIG. 6B schematically depicts a plan front view of the example slack monitoring system of FIG. 4B depicting an example series switch circuit arrangement of an electrical circuit of the example slack monitoring system according to one or more embodiments described and illustrated herein.

Now referring to FIG. 6B, in this depicted embodiment, the electrical circuit 186 may be arranged as three switches in a series circuit arrangement. That is, each of the pair of bushing members 157*a*, 157*b* that corresponded to each of the sub-shackle assemblies 140*a*, 140*b*, 140*c* define electrical switches, as described in greater detail herein, and are arranged to be in a series arrangement. As depicted, FIG. 6B is schematically depicted in the slack condition (e.g., the tension of the biasing member 136 is greater than the tension applied by the corresponding elevator suspension member 14 such that the gap 138 is increased to the distance D1 and either one or both of the pair of bushing members 157*a*, 157*b* exceed the predetermined distance from one another).

As such, each of the switches (e.g., the electrical contact between each of the pair of bushing members 157*a*, 157*b* that corresponded to each of the sub-shackle assemblies 140*a*, 140*b*, 140*c*) are depicted in an open configuration. That is, in this configuration, the electrical signal is not transferred or is prohibited from continuing through the electrical circuit 186 by not passing through one of the pair of bushing members 157*a*, 157*b* for all of the sub-shackle assemblies 140*a*, 140*b*, 140*c*. As such, while it is depicted that one of the pair of bushing members 157*a*, 157*b* for all three of the sub-shackle assemblies 140*a*, 140*b*, 140*c* are in the open switch configuration, this is for illustrative purposes only and this arrangement in series only requires one open switch configuration to break the electrical signal for the slack monitoring system 176 to generate the alert. Therefore, this arrangement advantageously may be used when only one of the sub-shackle assemblies 140*a*, 140*b*, 140*c* needs to be in the slack condition to generate the alert of the slack condition. The series arrangement of the electrical circuit 186 may be defined by the arrangement of the conductive flexible members 184*a*, 184*b* and the interaction with the respective pair of bushing members 157*a*, 157*b* and the slack monitoring system 176.

Now referring to FIG. 7, the shackle assembly 228*a* of the present disclosure will be discussed in greater detail. It is understood that shackle assembly 228*a* is similar to the shackle assembly 128*a* with the exceptions of the features described herein. As such, like features will use the same reference numerals with a prefix "2" for the reference numbers. As such, for brevity reasons, these features will not be described again.

In the depicted embodiment, the biasing member 236 may be any resilient material that is configured to be compressed and uncompressed, such as an elastomer material. However, it should be appreciated that other materials may be utilized for the biasing member as understood by those having skill in the art. In the depicted embodiment, the biasing member 236 may be a resilient member 288 extending in the vertical direction (i.e., in the +/−Z direction) a distance of the gap 238, similar to the biasing member 36, 136 depicted in FIGS. 3 and 4A-4B, respectively. In other embodiments, the biasing member 236 may be a pair of resilient members arranged to be coaxially aligned with one another and the elongated member 246 to face one another. Further yet, in other embodiments, there may be more than two resilient members.

The resilient member 288 is configured to be part of and/or define the bushing members (e.g., the bushing members 57*a*, 57*b* depicted in FIG. 3 and/or the bushing members 157*a*, 157*b* depicted in FIGS. 4A-4B). Each resilient member 288 is positioned within the gap 238 between the interior surfaces 274*a* of each of the first planar members 270*a*, 270*b*, 270*c* and the inner surfaces 275*a* of the second planar members 272*a*, 272*b*, 272*c*. Further, each resilient member 288 includes a terminating end 290*a* that abuts or is positioned to be nearest to the interior surface 274*a* of each of the first planar members 270*a*, 270*b*, 270*c* and a terminating end 290*b* that abuts or is positioned to be nearest to the inner surface 275*a* of each of the second planar members 272*a*, 272*b*, 272*c*.

Each resilient member 288 includes a bore extending from the terminating end 290*a* through the terminating end 290*b* to receive portions of the elongated member 246 in the vertical direction therethrough (i.e., in the +/−Z direction). Further, each resilient member 288 is coaxially aligned with the elongated member 246 such that at least portions of the resilient member 288 circumferentially surround portions of the elongated member 246 positioned within the bore of the resilient member 288.

Further, in the depicted embodiment, a pair of conductive members 292*a*, 292*b*, are positioned within the gap 238 and extend between and from the interior surfaces 274*a* of each of the first planar members 270*a*, 270*b*, 270*c* and the inner surfaces 275*a* of the second planar members 272*a*, 272*b*, 272*c*, respectively. That is, each conductive member 292*a* includes a base surface 294*a* that abuts or extends from interior surface 274*b* of each of the first planar members 270*a*, 270*b*, 270*c* and an opposite contact surface 294*b* that faces the inner surface 275*a* of each of the second planar members 272*a*, 272*b*, 272*c*, respectively. Additionally, each conductive member 292*b* includes a base surface 296*a* that abuts or extends from inner surface 275*a* of each of the second planar members 272*a*, 272*b*, 272*c* and an opposite contact surface 296*b* that faces the interior surface 274*b* of each of the first planar members 270*a*, 270*b*, 270*c*, respectively.

In some embodiments, each of the pair of conductive members 292*a*, 292*b* are fixedly coupled to the respective interior surface 274*b* and inner surfaces 275*a*. In some embodiments, the each of the pair of conductive members 292*a*, 292*b* are fixedly coupled via a fastener. Example fasteners include, without limitation, screw, nut and bolt, weld, epoxy, adhesive, rivets, hook and loop, and/or the like. In other embodiments, each of the pair of conductive members 292*a*, 292*b* may be formed with each of the first planar members 270*a*, 270*b*, 270*c* and each of the second planar members 272*a*, 272*b*, 272*c*, respectively, to be a monolithic single structure (e.g., formed from the same material as a single piece).

Each one of the pair of conductive members 292*a*, 292*b* per sub-shackle assembly 240*a*, 240*b*, 240*c* are in electrical communication with the conductive flexible members 284*a*, 284*b*, respectively, and the slack monitoring system 276. As such, in this embodiment, each one of the pair of conductive members 292*a*, 292*b* per sub-shackle assembly 240*a*, 240*b*, 240*c*, the conductive flexible members 284*a*, 284*b*, and the slack monitoring system 276 define the electrical circuit 286.

As depicted, in this embodiment, each of the pair of conductive members 292*a*, 292*b* are coaxially aligned with one another but are offset from the elongated member 246 and/or the biasing member 236 (depicted as resilient member 288). It should be understood that each of the pair of conductive members 292*a*, 292*b* may be utilized with the resilient member 288 as depicted in FIG. 7, and/or may be used in addition to or with the biasing members 36, 136 of FIGS. 3 and 4A-4B, respectively, and/or the pair of bushing members 57*a*, 57*b*, 157*a*, 157*b* of FIGS. 3 and 4A-4B, respectively. As such, coil springs as the biasing member and the pair of conductive members 292*a*, 292*b* may be used together or in combination and/or coil springs as the biasing member, the pair of bushings, and the pair of conductive members 292*a*, 292*b* may be used together or in combination.

FIG. 7 depicts the elevator suspension members 14 for each of the sub-shackle assembly 240*a*, 240*b*, 240*c* in the slack condition such that the tension of the resilient member 288 is greater than the tension applied by the corresponding elevator suspension member 14, and the gap 238 is increased to the distance D1. The resilient member 288 has moved either one or both of the independent first planar member 270*a*, 270*b*, 270*c* and the independent second planar member 272*a*, 272*b*, 272*c* to increase the gap 238, which also increases the distance between the contact surface 296*a*, 296*b* of each of the pair of conductive members 292*a*, 292*b*, respectively, to exceed the predetermined distance from one another.

Under normal conditions, (e.g., in a non-slack condition), the contact surface 296*a*, 296*b* of each of the pair of conductive members 292*a*, 292*b*, respectively, abut, make contact at least partially, or are positioned with a space between the contact surface 296*a*, 296*b* that will still permit the electrical signal to pass through one of the pair of conductive members 292*a*, 292*b* into and through the other one of the pair of conductive members 292*a*, 292*b*. As such, similar to what is discussed above with respect to the pair of bushing members 157*a*, 157*b*, the pair of conductive members 292*a*, 292*b* each formed with or include conductive material that receives and transmits or allows electrical signal(s) to pass therethrough to the conductive flexible members 184*a*, 184*b*, respectively, and to the slack monitoring system 276. When the contact surface 296*a*, 296*b* between the pair of conductive members 292*a*, 292*b*, respectively, is equal to or less than the predetermined distance, electrical signal(s) can pass through the electrical circuit 286 utilizing the pair of conductive members 292*a*, 292*b* as a switch similar to the pair of bushing members 157*a*, 157*b* depicted in FIGS. 4A and 5A. Conversely, when the distance between the contact surface 296*a*, 296*b* of the pair of conductive members 292*a*, 292*b* is greater than the predetermined distance, the electrical signal cannot pass, which is indictive of the slack condition, as depicted in FIG. 7.

This results in the slack monitoring system 276 not receiving the electrical signal back in a predetermined time. In response, the slack monitoring system 276 initiates an alert to stop the traction sheave 18*a* (FIG. 2) which in turn prohibits the elevator cab 12 and/or weights 24 from moving (FIG. 1). The alert may be a program command executed by the at least one processor 178 (FIG. 4A) to stop the traction sheave 18*a* (FIG. 2) either directly to the traction sheave 18*a* and/or to an elevator controller (master controller for the elevator assembly 10 (FIG. 1)), which in turn stops any movement. In addition, or alternatively, the alert may be a command to a CPU or other electronic device to alert a user or technician to stop the elevator assembly 10 or to take some action to perform maintenance and/or the like.

As such, it should now be understood that the electrical circuit 286 is arranged such that each of the pair of conductive members 292*a*, 292*b* are now electrical contacts and are configured to make or define an electrical switch such that when the biasing member 136 (FIGS. 4A-4B) and/or resilient member 288 is compressed enough by the tension generated in the elevator suspension member 14, the switch defined by the pair of conductive members 292*a*, 292*b* in the electrical circuit 286 is closed. Conversely, under the slack condition when the tension generated in the elevator suspension member 14 is less than a predetermined tension amount, the biasing member 136 (FIGS. 4A-4B) and/or the resilient member 288 moves or drives at least one of the pair of conductive members 292*a*, 292*b* away from one another to create an open switch (e.g., separating the contact surfaces 296*a*, 296*b* greater than the predetermined distance), thereby not permitting the electrical signal to return to the slack monitoring system 276.

It should now be understood that the embodiments described herein are directed to improved systems to monitor a slack condition on a single suspension member and may be adapted to monitor for the slack condition on a plurality of suspension members. As such, during normal operation, an electrical circuit permits for signals to be generated by and return to a controller or ECU by a tension in the suspension members keeping conductive members within a predetermined distance. The return of the signal within a predetermined time indicates that the suspension members are normal and not under the slack condition. On the other hand, when there is at least one suspension member that has failed to maintain tension, then the conductive members are moved apart from one another beyond the predetermined distance such that electrical signal cannot pass from one conductive member to another. The failure of the electrical signal to make it back to the controller or ECU within the predetermined time indicates a slack condition of at least one of the suspension members.

Each suspension member may be monitored individually instead of requiring all suspension members to go slack at once in conventional assemblies. The arrangement in the embodiments disclosed herein improve design modularity and scalability. Further, because existing hardware may be used as a switch in the electrical circuit and the amount of movement required to change the system to an open circuit is minimal, alternatives to coil springs may be used (e.g., elastomer materials), which may reduce cost and may improve ride quality of the elevator cab. That is, this arrangement may permit for less components to be used. Further, since each suspension member has its own switch in the electrical circuit, the arrangement in the embodiments described herein increases flexibility in how the monitoring system is wired to detect slack belt condition (e.g., series or parallel switch arrangement to detect a single suspension member under the slack condition or any additional number of suspension members including all suspension members to be slack).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A slack monitoring system configured for detecting a slack condition in at least one suspension member of a plurality of suspension members of an elevator system, the slack monitoring system comprising:

at least one processor; and a shackle assembly coupled to each of the plurality of suspension members, the shackle assembly including:

a first planar member having a first surface and an opposite second surface;

a second planar member having a third surface and an opposite fourth surface, the second planar member being spaced apart from the first planar member to define a gap;

at least one biasing member positioned within the gap, a first conductive member extending from the second surface of the first planar member; and a second conductive member extending from the third surface of the second planar member, wherein an electrical circuit is defined by the first conductive member, the second conductive member and the at least one processor such that when a current tension of the at least one suspension member of the plurality of suspension members is less than a predetermined tension threshold, the biasing member biases the first planar member or the second planar member to enlarge the gap thereby separating the first conductive member and the second conductive member to a distance that prohibits an electrical communication between the first conductive member and the second conductive member.

2. The slack monitoring system of claim 1, wherein when the current tension of the plurality of suspension members is at or exceeds the predetermined tension threshold effected onto the shackle assembly the electrical communication between the first conductive member and the second conductive member is maintained.

3. The slack monitoring system of claim 2, further comprising:

a biasing member positioned within the gap and configured to bias the first planar member or the second planar member, wherein the first conductive member or the second conductive member are electrically isolated from the biasing member and the corresponding first planar member or the second planar member.

4. The slack monitoring system of claim 3, wherein the biasing member is a coil spring.

5. The slack monitoring system of claim 3, wherein the biasing member is formed from an elastomer material.

6. The slack monitoring system of claim 1, wherein the first conductive member and the second conductive member are each a bushing member.

7. The slack monitoring system of claim 1, wherein when the at least one processor detects the slack condition, an alert is generated to inhibit movement of the plurality of suspension members of the elevator system.

8. The slack monitoring system of claim 1, wherein the at least one processor is configured to determine whether there is the electrical communication between the first conductive member and the second conductive member.

9. The slack monitoring system of claim 8, wherein the electrical communication between each of the corresponding first conductive member and each of the corresponding second conductive member is in a series circuit arrangement.

10. The slack monitoring system of claim 8, wherein the electrical communication between each of the corresponding first conductive member and each of the corresponding second conductive member is in a parallel circuit arrangement.

11. A slack monitoring system configured for detecting a slack condition in at least one suspension member of a plurality of suspension members of an elevator system, the elevator system having an elevator cab or a counterweight, the plurality of suspension members coupled thereto within a hoistway, the plurality of suspension members move the elevator cab or the counterweight between a plurality of positions within the hoistway, the slack monitoring system comprising:

at least one processor; and a shackle assembly coupled to each of the plurality of suspension members, the shackle assembly including:

a first planar member having a first surface and an opposite second surface;

a second planar member having a third surface and an opposite fourth surface, the second planar member being spaced apart from the first planar member to define a gap;

at least one biasing member positioned within the gap;

an elongated member corresponding to a number of suspension members of the plurality of suspension members and positioned within the gap extending through the second planar member and the gap such that a distal end of the elongated member is positioned to extend beyond the fourth surface to a corresponding suspension member of the plurality of suspension members;

a first conductive member extending from the second surface of the first planar member; and a second conductive member extending from the third surface of the second planar member, wherein an electrical circuit is defined by the first conductive member, the second conductive member and the at least one processor such that when a current tension of the at least one suspension member of the plurality of suspension members is less than a predetermined tension threshold, the biasing member biases the first planar member or the second planar member to enlarge the gap thereby separating the first conductive member and the second conductive member to a distance that prohibits an electrical communication between the first conductive member and the second conductive member.

12. The slack monitoring system of claim 11, wherein the at least one biasing member is coaxially aligned with the elongated member such that portions of the elongated member are axially received within the at least one biasing member to circumferentially surround the elongated member within the gap.

13. The slack monitoring system of claim 12, wherein the first conductive member is coaxially aligned with the elongated member and the at least one biasing member such that portions of the at least one biasing member circumferentially surround portions of the first conductive member.

14. The slack monitoring system of claim 13, wherein the second conductive member is coaxially aligned with the elongated member and the at least one biasing member such that portions of the at least one biasing member circumferentially surround portions of the second conductive member.

15. The slack monitoring system of claim 11, wherein the first conductive member and the second conductive member are each a bushing member.

16. The slack monitoring system of claim 11, wherein the first conductive member or the second conductive member are electrically isolated from the at least one biasing member and the corresponding first planar member or second planar member.

17. The slack monitoring system of claim 11, wherein the electrical circuit further comprises:

at least two conductive flexible members that are electrically coupled to the at least one processor and one of the at least two conductive flexible members are electrically coupled to one of the first conductive member or the second conductive member and the other one of the at least two conductive flexible members are electrically coupled to the other one of the first conductive member or the second conductive member to define the electrical circuit.

18. The slack monitoring system of claim 17, wherein the at least one processor is configured to generate an electrical signal to transmit through the electrical circuit at predetermined intervals or at a continuous rate to detect the slack condition when the electrical signal does not return to the at least one processor within a predetermined amount of time.

19. A slack monitoring system configured for detecting a slack condition in at least one suspension member of a plurality of suspension members of an elevator system, the elevator system having an elevator cab or a counterweight and a shackle assembly, the plurality of suspension members being coupled to the elevator cab or the counterweight and to the shackle assembly within a hoistway, the plurality of suspension members move the elevator cab or the counterweight between a plurality of positions within the hoistway, the shackle assembly having a first planar member having a first surface and an opposite second surface, a second planar member having a third surface and an opposite fourth surface, the second planar member being spaced apart from the first planar member to define a gap, an elongated member extending through the second planar member and the gap such that a distal end of the second planar member is positioned to extend beyond the fourth surface and is configured to couple to the at least one suspension member of the plurality of suspension members, and at least one biasing member positioned within the gap, the at least one biasing member coaxially aligned with the elongated member such that the portions of the elongated member are axially received within the at least one biasing member to circumferentially surround the elongated member within the gap, the slack monitoring system comprising:

at least one processor; and an electrical circuit in electrical communication with the at least one processor, the electrical circuit defined by the at least one processor, a first conductive member, a second conductive member, and at least two conductive flexible members that are electrically coupled to the at least one processor and one of the at least two conductive flexible members are electrically coupled to one of the first conductive member or the second conductive member and the other one of the at least two conductive flexible members are electrically coupled to the other one of the first conductive member or the second conductive member, wherein:

in a first position, an electrical signal is configured to pass from the at least one processor and through the electrical circuit and in a second position, the electrical signal is prohibited from passing through the electrical circuit, when a predetermined tension is effected onto the shackle assembly caused by a tension of the at least one suspension member of the plurality of suspension members, the electrical circuit is in the first position, and in response to the slack condition when the tension being less than the predetermined tension, the biasing member biases the first planar member or the second planar member to enlarge the gap thereby separating the first conductive member and the second conductive member to a distance that causes the electrical circuit to be in the second position.

20. The slack monitoring system of claim 19, wherein:

the electrical communication between each of the corresponding first conductive member and each of the corresponding second conductive member is in a series circuit arrangement; or the electrical communication between each of the corresponding first conductive member and each of the corresponding second conductive member is in a parallel circuit arrangement.

* * * * *